US007633747B2

(12) United States Patent
Yang et al.

(10) Patent No.: US 7,633,747 B2
(45) Date of Patent: Dec. 15, 2009

(54) PORTABLE MULTIMEDIA DEVICE WITH DISPLAY BRACKET SWITCH AND METHOD OF OPERATING THE SAME

(75) Inventors: Duk-Joon Yang, Seoul (KR); Dong-Hoon Kim, Seoul (KR)

(73) Assignee: Reigncom Ltd., Seoul (KR)

( * ) Notice: Subject to any disclaimer, the term of this patent is extended or adjusted under 35 U.S.C. 154(b) by 501 days.

(21) Appl. No.: 11/357,453

(22) Filed: Jan. 4, 2006

(65) Prior Publication Data

US 2006/0250762 A1 Nov. 9, 2006

(30) Foreign Application Priority Data

May 6, 2005 (KR) .............................. 2005-037997

(51) Int. Cl.
*H05K 5/00* (2006.01)
*H05K 7/00* (2006.01)
*G06F 3/041* (2006.01)

(52) U.S. Cl. .............................. 361/679.3; 361/679.21; 361/679.26; 345/173

(58) Field of Classification Search ................. 361/681, 361/679.21, 679.26, 679.3; 348/14.03; 345/173
See application file for complete search history.

(56) References Cited

U.S. PATENT DOCUMENTS

| 5,408,057 A * | 4/1995 | Hayes ......................... 200/5 A |
| 6,229,695 B1 * | 5/2001 | Moon .......................... 361/683 |
| 6,842,333 B2 * | 1/2005 | Lee et al. ..................... 361/681 |
| 2002/0000976 A1 * | 1/2002 | Salminen et al. ............ 345/169 |
| 2003/0132918 A1 * | 7/2003 | Fitch et al. ................... 345/173 |
| 2003/0223187 A1 * | 12/2003 | Tsao et al. ................... 361/681 |
| 2006/0028428 A1 * | 2/2006 | Dai et al. ..................... 345/156 |
| 2006/0050059 A1 * | 3/2006 | Satoh et al. ................. 345/173 |
| 2006/0133018 A1 * | 6/2006 | Okuda ......................... 361/681 |
| 2007/0152975 A1 * | 7/2007 | Ogihara et al. .............. 345/173 |
| 2008/0007538 A1 * | 1/2008 | Kotera et al. ................ 345/173 |
| 2008/0100568 A1 * | 5/2008 | Koch et al. .................. 345/156 |

* cited by examiner

*Primary Examiner*—Jayprakash N Gandhi
*Assistant Examiner*—Anthony M Haughton
(74) *Attorney, Agent, or Firm*—Lee, Hong, Degerman, Kang & Waimey

(57) ABSTRACT

A portable multimedia device and a method of operating the same enables operation of a display device by direct manipulation of a bracket housing a display window of a portable communication device such as an MP3 player, a portable multimedia player, or a digital camera. The portable multimedia device includes: a display bracket housing the display window; a PCB bracket installed at a rear surface of the display bracket and is movable within a limited range in a thickness direction; a PCB fixed in the PCB bracket between the display bracket and the PCB bracket; and a plurality of tact switches installed around a periphery of the PCB capable of contacting the rear surface of the display bracket. Each of the tact switches controls one or more function of the portable multimedia device.

15 Claims, 8 Drawing Sheets

(a)

(b)

PORTABLE MULTIMEDIA DEVICE WITH DISPLAY BRACKET SWITCH AND METHOD OF OPERATING THE SAME

CROSS-REFERENCE TO RELATED APPLICATIONS

Pursuant to 35 U.S.C. § 119(a), this application claims the benefit of earlier filing date and right of priority to Korean Patent Application No. 2005-037997, filed on May 6, 2005, the content of which is hereby incorporated by reference herein in its entirety.

FIELD OF THE INVENTION

The present invention relates to a portable multimedia device with a display bracket switch and a method of operating the same, and more particularly to a portable multimedia device that can be driven by manipulation of a bracket housing a display device for an MP3 (MPEG audio layer-3) player, a PMP (portable multimedia player), a digital camera, a mobile telecommunication device, etc., and a method of operating the same.

BACKGROUND OF THE INVENTION

Recently, the performance of portable devices essential to modern living, such as an MP3 player and a mobile phone, has been remarkably improved due to development of audio and telecommunications technology.

For example, the MP3 player is a device that can be used for recording and reproducing MP3 files containing music or other audio data downloaded from the Internet or converted from other media. The MP3 player may include an earphone jack thereby enabling a user to listen to reproduced files through earphones.

In addition to reproducing MP3 data, the MP3 player may perform various other functions such as receiving FM radio for reproduction or recording, converting the output of an audio device into MP3 files, voice recording, dictionary applications, and games. The demand for more functions is continuously increasing.

In addition to its various functions, the MP3 player has numerous controllable parameters such as volume, MP3 file, beat parameters, equalizer parameters, and various menu parameters. A large display window is required to visually represent the various menus and settings and numerous switches are required enabling a user to control the functions and parameters.

As shown in FIG. 1, a conventional portable multimedia device 10 such as an MP3 player generally includes various switches 1 and 3 installed on its front and sides, and a display window 2 disposed on its front. Since the switches take up considerable space, it is difficult to increase the size of the display window 2 beyond a certain limit. In order to significantly increase the size of the display window 2, the entire device must be enlarged.

If the display window 2 is enlarged to span the entire surface of the device, the various switches 1 and 3 would then be installed on the sides thereby making operation inconvenient.

As an example of technology intended to solve this problem, a touch screen has been proposed. The touch screen is used in combination with a general soft display such as a cathode ray tube (CRT), a liquid crystal display (LCD), a plasma display panel (PDP), or an organic light emitting display (OLED), and is manufactured as a separate device mechanically engaged with a display screen.

FIG. 2 is a schematic side view of a conventional touch screen. The touch screen 20 includes a transparent substrate 12, which is generally formed of a rigid glass material but may alternatively be formed of a flexible material such as plastic. Various additional material layers for forming a contact detection device 14 of the touch screen 20 are formed on an upper surface of the substrate 12. The contact detection device 14 includes a converter and a circuitry required to detect physical contact in a manner that can be used to calculate a contact position. A cable 16 is connected to the circuitry so that various signals can be transmitted to and received from the touch screen 20. The cable 16 is connected to an external controller 18. The external controller 18 controls application of various signals of the touch screen 20 and calculates (x, y) coordinates where contact occurs on a contact part.

Conventional touch screen technology using the above basic structure may employ resistive, capacitive, ultrasonic, surface acoustic wave, or other contact detection techniques.

A resistive touch screen generates a voltage in proportion to a relative resistance of a circuit located at a contact point, and measures the voltage to calculate (x, y) coordinates of the contact point.

A capacitive touch screen uses current variations due to contact of a conductive material to calculate (x, y) coordinates of a contact point.

An ultrasonic method applies a theory in which a sound wave field is disturbed when an object contacts the touch screen and measures the disturbance to calculate (x, y) coordinates.

When the touch screen is adapted to a portable device such as a mobile phone or a remote controller, an input may be made by the press and touch of a stylus pen or by the touch of a user's fingertip. However, when the stylus pen is employed, more than a predetermined level of pressure should be applied, the touch screen is less durable, and it is troublesome for the user to carry the stylus pen in addition to the main body.

Examples of proposed solutions to the above problems are disclosed in Korean Patent Laid-open Publication No. 1999-75892 entitled "ELECTRONIC BOOK FOR DISPLAYING DATA DOWNLOADED FROM TELECOMMUNICATION NETWORK", and Korean Patent Laid-open Publication No. 2004-103562 entitled "KEY-PAD COMBINED WITH TOUCH SCREEN".

Korean Patent Laid-open Publication No. 1999-75892 discloses an electronic book for displaying content stored in a memory device, the electronic book includes: a liquid crystal display for displaying data stored in the electronic book; an input means such as a touch pen and a touch panel input device for inputting information and selecting from a menu displayed on a screen; a telecommunication network connection socket and a connection device for connecting to an external data telecommunication network; a computer connection socket and a computer telecommunication connection device for transmitting and receiving data stored in a computer; and keys for controlling various operations.

Korean Patent Laid-open Publication No. 2004-103562 discloses a key-pad combined with a touch input means integrally formed with or separately added to a display unit for displaying a key definition, the key-pad including: an upper layer having a predetermined number of keys to be pressed; and a lower layer having projections for transmitting pressure to the touch input means corresponding to each key of the upper layer, wherein the keys are disposed at key definition regions displayed on the display unit, the key definitions displayed on the display unit are formed in a visually recognizable manner, and the keys are spaced apart from the touch input means by a contactable gap.

However, as described above, the conventional art forces a user to use both hands to precisely input data when the user's fingertip contacts the screen. In particular, when a portable multimedia device employing a conventional touch screen is operated with one hand, it is easy to accidentally touch more than one key active region in an overlapping manner so that a precise contact value cannot be selected.

Also, it is troublesome for the user to have to look at the display window while operating the device to perform a desired function in a conventional portable multimedia device adopting the touch screen.

SUMMARY OF THE INVENTION

The present invention provides a portable multimedia device with a display bracket switch enabling enlargement of a display window and facilitating easy manipulation of the switch, and a method of operating the same.

The present invention also provides a portable multimedia device with a display bracket switch enabling easy operation of the device without viewing the display window, and a method of operating the same.

The present invention also provides a portable multimedia device with a display bracket switch enabling a user to instinctively select contents or menu items displayed on a screen, and a method of operating the same.

According to one aspect of the present invention, there is a portable multimedia device with a display bracket switch having a case, a display window, and various switches. The portable multimedia device comprises a display bracket for fixing the display window, a PCB bracket installed at a rear surface of the display bracket to be movable within a limited range in a thickness direction, a PCB fixed to the PCB bracket between the display bracket and the PCB bracket, and a plurality of tact switches installed around the periphery of the PCB to contact the rear surface of the display bracket.

In addition, the portable multimedia device with a display bracket switch may further include a holder for regulating movement of the display bracket toward the PCB bracket.

In addition, in the portable multimedia device with a display bracket switch, the display bracket may include an upper case, and a display cover fixed to the upper case.

In addition, in the portable multimedia device with a display bracket switch, the holder, movably disposed between the PCB bracket and the PCB in a lateral direction, may have a groove or a hole formed at its periphery, and the display cover may have a projecting guide pin formed at its rear surface at a position corresponding to the groove or hole.

In addition, in the portable multimedia device with a display bracket switch, the depth of the groove or hole of the holder may be greater than an operational displacement of the tact switches.

In addition, in the portable multimedia device with a display bracket switch, the PCB bracket may have a guide pin formed at its upper surface, and the holder may have a notch or an elongated hole having a length corresponding to maximum displacement of the guide pin.

In addition, in the portable multimedia device with a display bracket switch, the plurality of tact switches may be disposed at upper, lower, right, and left sides of the surface of the periphery of the PCB.

In addition, in the portable multimedia device with a display bracket switch, the plurality of tact switches may be disposed at the center portion of upper, lower, right, and left sides of the upper surface of the periphery of the PCB.

According to another aspect of the present invention, there is a portable multimedia device with a display bracket switch having a case, a display window, a PCB, and various switches. The portable multimedia device comprises a display bracket for fixing the display window, a plurality of tact switches installed around the periphery of the PCB to contact a rear surface of the display bracket, and a plurality of operation display parts disposed corresponding to the plurality of tact switches, respectively, and displayed on the display window.

In addition, the portable multimedia device with a display bracket switch may further include a status display part for displaying an operation status on the display window.

In addition, in the portable multimedia device with a display bracket switch, when each of the plurality of tact switches is operated, at least two functions may be sequentially displayed on the status display part.

In addition, in the portable multimedia device with a display bracket switch, the plurality of operation display parts may be disposed at upper, lower, right, and left sides of the surface of the periphery of the display window.

In addition, in the portable multimedia device with a display bracket switch, the plurality of operation display parts may be disposed at the center portion of upper, lower, right, and left sides of the upper surface of the periphery of the display window.

According to yet another aspect of the present invention, there is a portable multimedia device with a display bracket switch having a case, a display window, a PCB, and various switches, the portable multimedia device including: a display bracket for fixing the display window; a plurality of tact switches installed around the periphery of the PCB to contact a rear surface of the display bracket; an operation sound generator for generating sound for each operation state of the plurality of tact switches; and a plurality of operation display parts disposed corresponding to the plurality of tact switches, respectively, and displayed on the display window.

According to still another aspect of the present invention, there is a method of operating a portable multimedia device with a display bracket switch including a case, a display window, a PCB, a display bracket for fixing the display window, a plurality of tact switches installed around the periphery of the PCB to contact a rear surface of the display bracket, a plurality of operation display parts disposed corresponding to the plurality of tact switches, respectively, and a status display part for displaying an operation status on the display window. The method includes operating one of the plurality of tact switches, generating an operation sound corresponding to the operation of the tact switch, displaying an operation state corresponding to the operation of the tact switch on the operation display part and the status display part, and performing a function corresponding to the state displayed by the status display part.

In addition, in the method of operating a portable multimedia device with a display bracket switch, when each of the plurality of tact switches is operated, at least two functions may be sequentially displayed on the status display part.

BRIEF DESCRIPTION OF THE DRAWINGS

The above and other objects, features, and advantages of the present invention will become more apparent from the following detailed description and the accompanying drawings, in which.

DETAILED DESCRIPTION OF THE EMBODIMENTS

Figure 1:
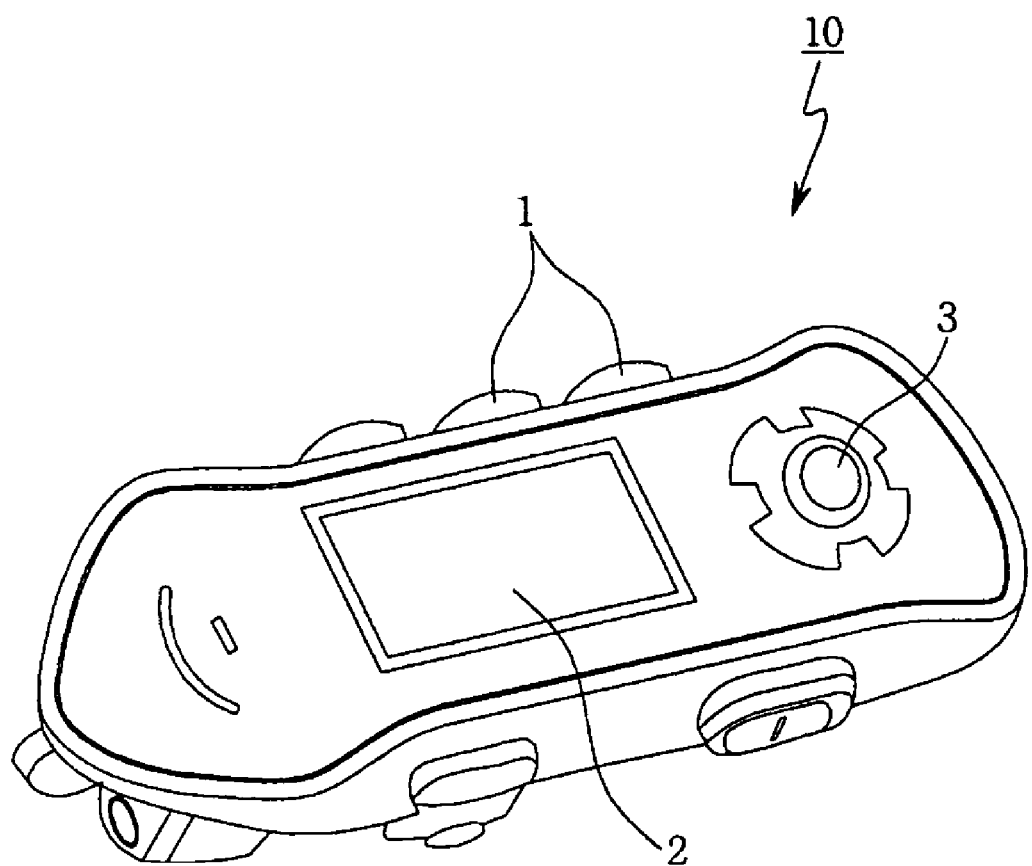
FIG. 1 is a perspective view of a conventional portable multimedia device.
Figure 2:
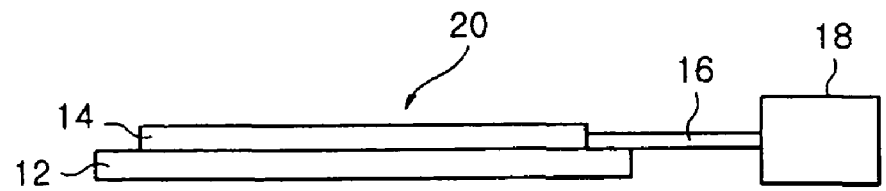
FIG. 2 is a schematic side view of a conventional touch screen.
Figure 3:
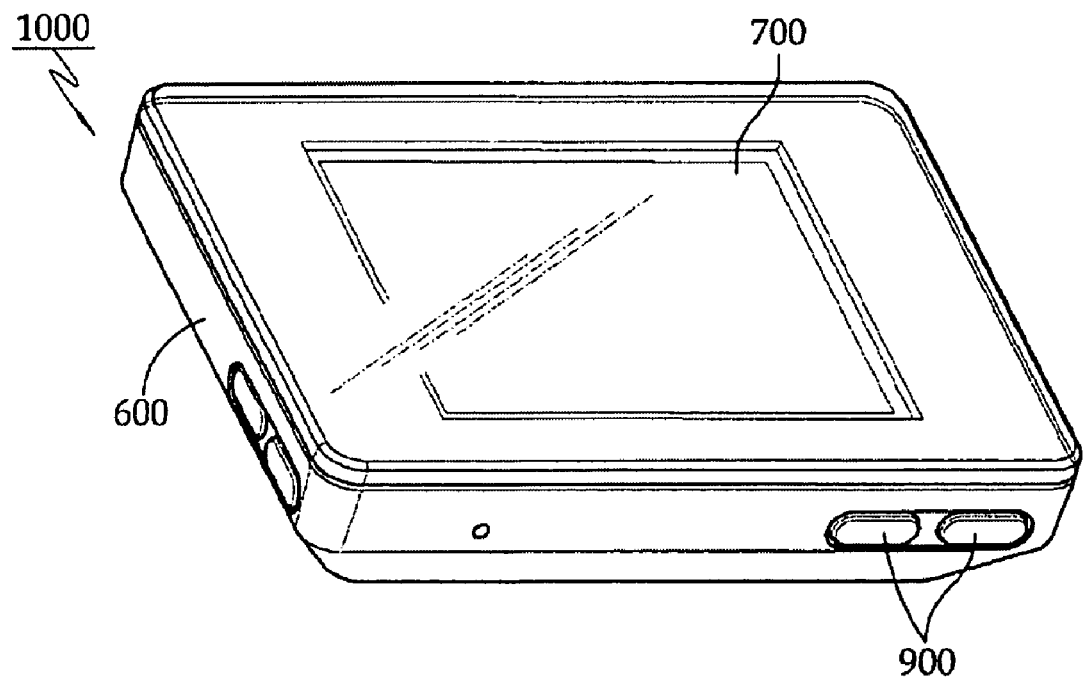
FIG. 3 is a perspective view of a portable multimedia device according to an exemplary embodiment of the present invention.

Hereinafter, an exemplary embodiment of the present invention will be described with reference to the accompanying drawings. Throughout the following description and the drawings, the same reference numerals are used to designate the same or similar components and descriptions of the same or similar components will not be repeated.

First, the mechanical structure of a portable multimedia device with a display bracket switch according to an exemplary embodiment of the present invention will be described in conjunction with FIGS. 3 to 7.

As shown in FIGS. 3 to 7, a portable multimedia device 1000 according to an exemplary embodiment of the present invention includes a case 600, a display window 700 installed on an entire upper surface, a PCB 300, and various switches 900. The display window 700 has a structure in which an LCD or OLED panel 710 is covered with a window 720, and an earphone jack 800 and various switches 900 are installed at side surfaces.

In addition, the portable multimedia device 1000 according to the exemplary embodiment further includes a display bracket 100 for fixing the display window 700, and a PCB bracket 200 installed at a rear surface of the display bracket 100 through a medium of the PCB 300.

Stud bolts 50 connect the display bracket 100 and the PCB bracket 200 to each other. In this case, the PCB bracket 200 is engaged with the stub bolts 50 in a relatively movable manner. The stud bolt 50 has a body functioning to guide movement of the PCB bracket 200, and a head functioning as a stopper. This arrangement permits the display bracket 100 to be moved toward the PCB bracket 200 within a limited range in a thickness direction.

As described above, the PCB 300 is disposed between the display bracket 100 and the PCB bracket 200, and is fixed to the PCB bracket 200.

While the display bracket 100 may be formed as an integral body, it preferably includes an upper case 140 formed of plastic, which is readily moldable, and a display cover 150 formed of metal, such as stainless steel, having high strength. The display cover 150 is shown affixed to the upper case 140. Here, the upper case 140 and the display cover 150 can be engaged with each other by inserting screws through installation holes 141 and 151. In addition, the display cover 150 may have flanges 153 to maintain alignment.

Figure 4:
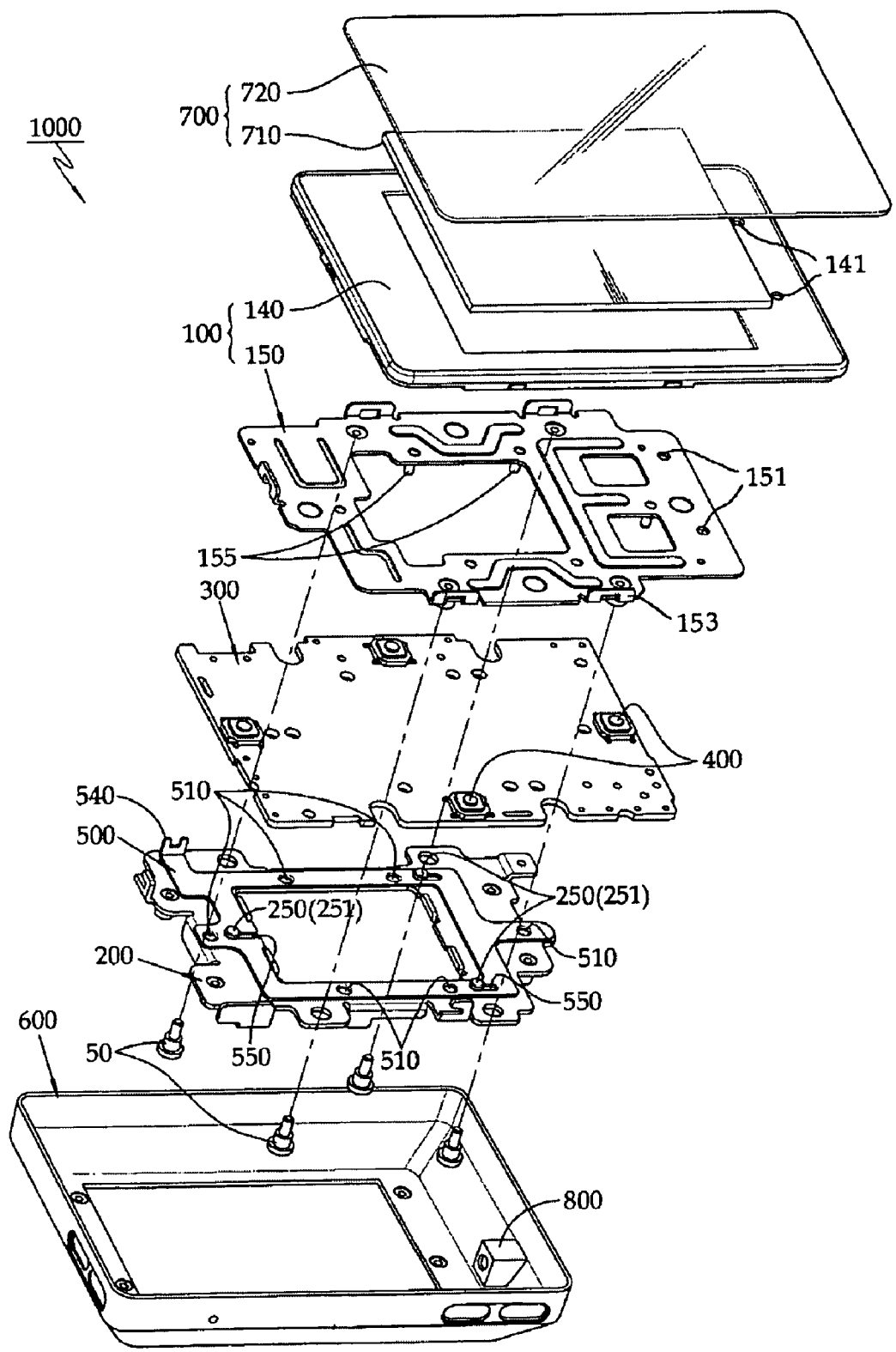
FIG. 4 is an exploded upper perspective view of a portable multimedia device according to an exemplary embodiment of the present invention.
Figure 5:
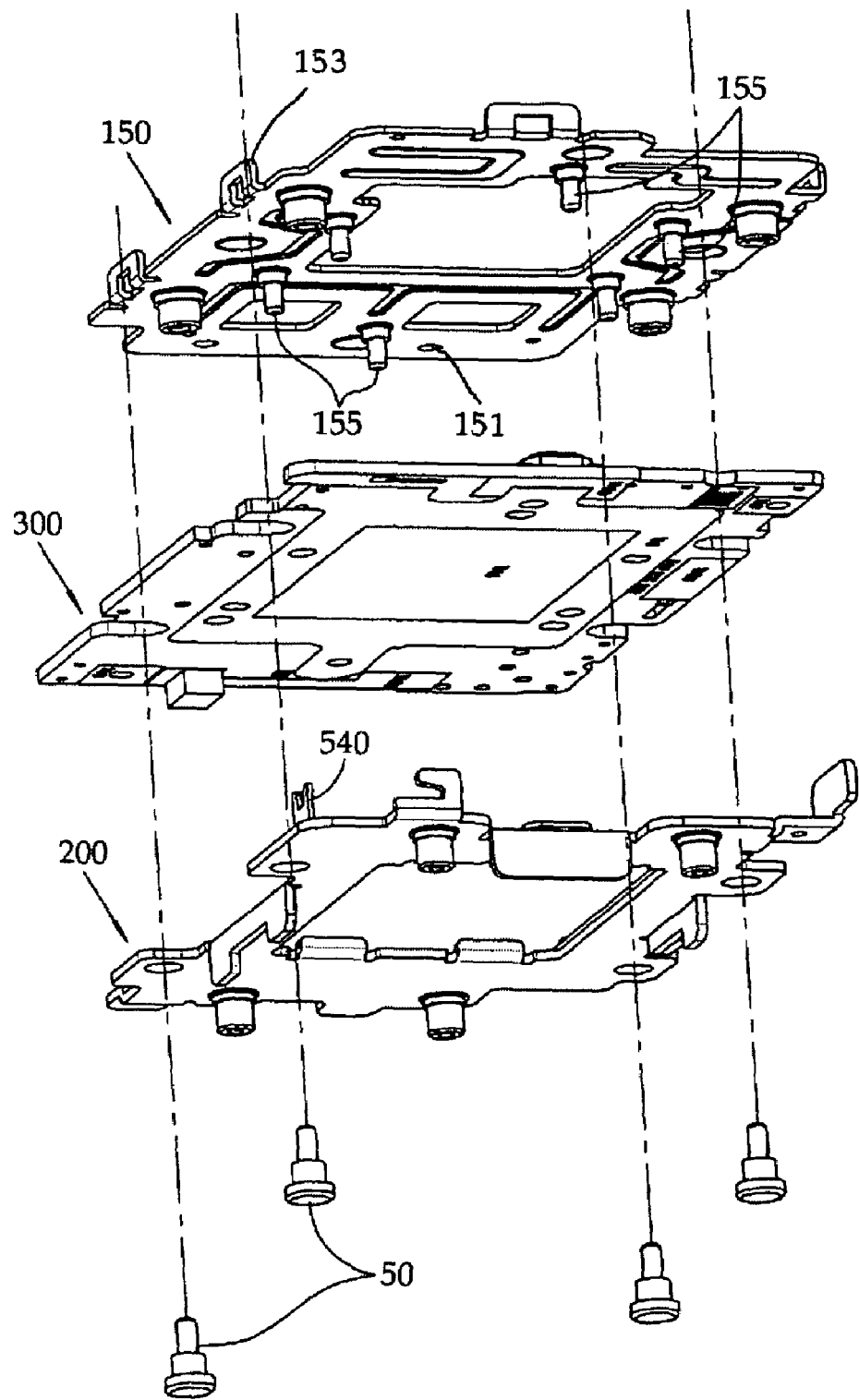
FIG. 5 is an exploded lower perspective view of a portable multimedia device according to an exemplary embodiment of the present invention.
Figure 6:
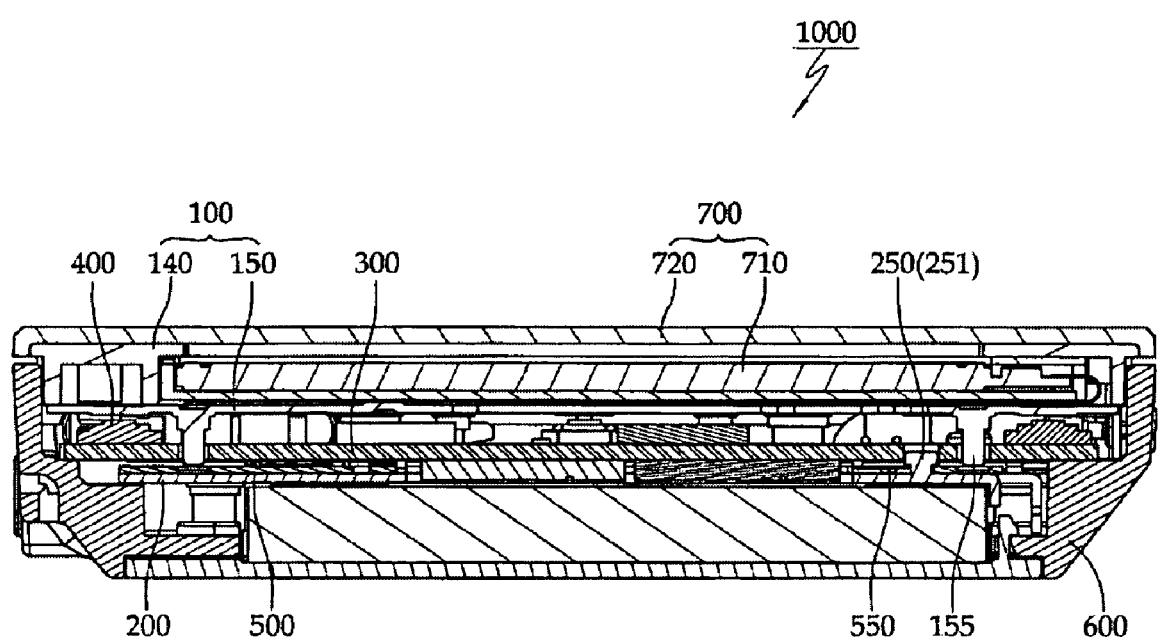
FIG. 6 is a cross-sectional view of a portable multimedia device according to an exemplary embodiment of the present invention.
Figure 7:
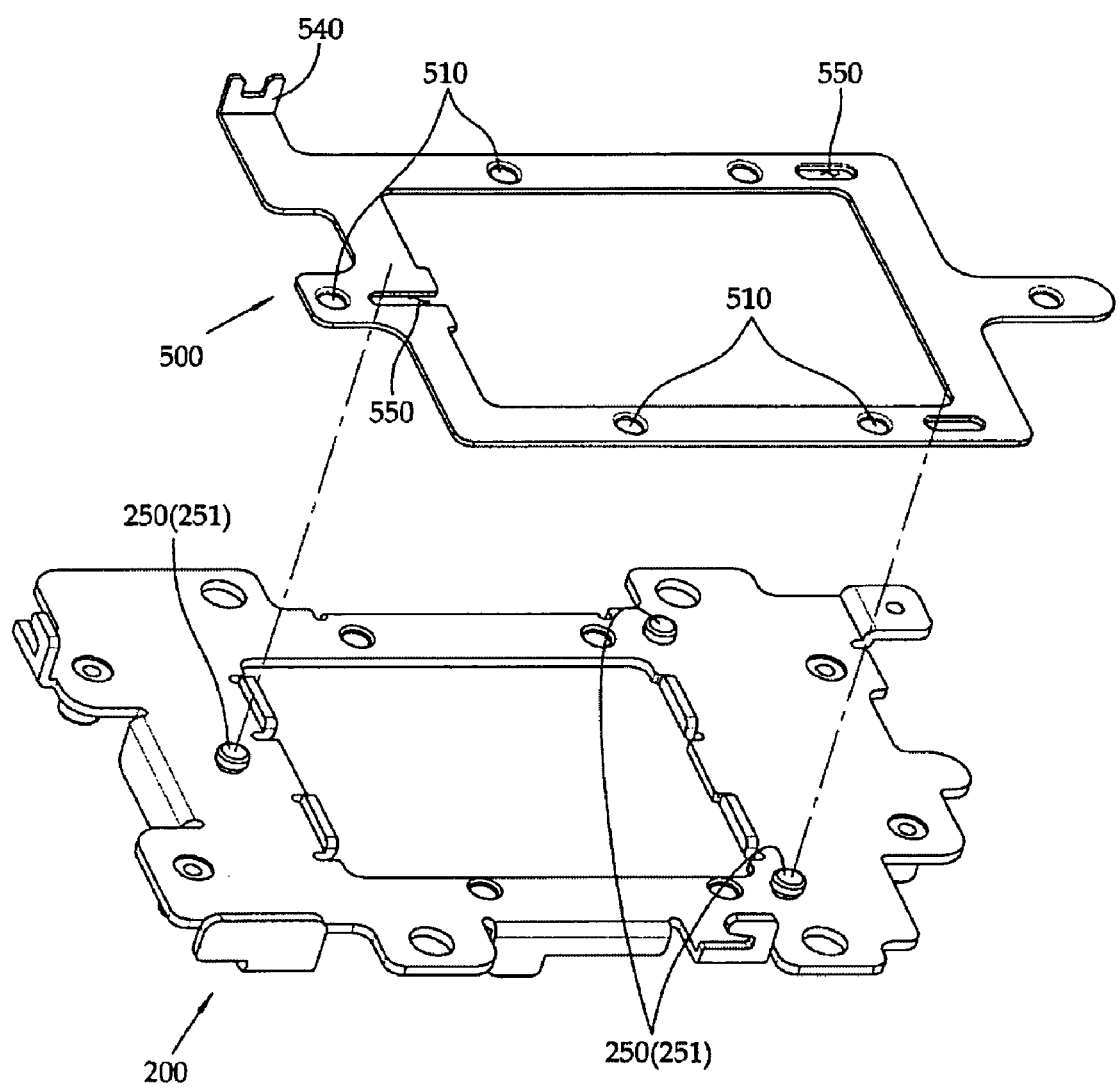
FIG. 7 is an exploded perspective view of a combined structure of a PCB bracket and a holder bracket of FIG. 4.

Further, the PCB 300 has a plurality of tact switches 400 disposed on the upper surface of its periphery so that the display bracket 100 can be pushed to contact the PCB 300. That is, as shown in FIG. 4, the plurality of tact switches 400 are disposed at center portions of upper, lower, right, and left sides of the upper surface of the periphery of the PCB 300.

As described above, according to the exemplary embodiment, a portion of the periphery of the display bracket 100 is pushed toward the PCB 300 and the PCB bracket 200 to allow the tact switches 400 to be operated. Here, since the tact switches 400 are installed along the periphery of the PCB 300 at predetermined intervals, when the display bracket 100 is pushed at one portion, the display bracket 100 is slightly inclined toward the PCB bracket 200.

Meanwhile, a holder 500 is installed between the PCB bracket 200 and the PCB 300 in a laterally movable manner to regulate movement of the display bracket 100 toward the PCB bracket 200, and thereby allow or prevent operation of the tact switches 400.

For this purpose, the holder 500 has grooves or holes 510 at its periphery, and the display cover 150 has pins 155 projecting from its rear surface. Here, preferably, the depth of the groove or hole 510 of the holder 500 is greater than the displacement of a depressed tact switch 400, and less than the thickness of the holder 500.

Therefore, when the pins 155 of the display cover 150 pass through holes formed at the PCB 300 to conform to the grooves or holes 510 of the holder 500, the pins 155 can pass through the holes 510 thereby allowing the movement of the display bracket 100 to operate each of the tact switches 400, depending on the inclination in the display bracket 100 toward the PCB bracket 200.

On the other hand, when the holder 500 is moved laterally to make the grooves or holes 510 deviate from the pins 155 of the display cover 150, movement of the display bracket 100 toward the PCB bracket 200 is blocked, since the pins 155 cannot pass through the holes 510.

Moreover, the PCB bracket 200 has guide pins 250 having head parts 251 formed at its upper surface, and the holder 500 has notches or elongated holes 550 of depth corresponding to maximum displacement of the guide pins 250. Therefore, when the holder 500 is laterally moved along the PCB bracket 200, the guide pins 250 are smoothly guided along the notches or elongated holes 550 without separating from them. The holder 500 can be moved using a holder lever 540 formed at its side surface. Meanwhile, the case 600 is secured to the PCB bracket 200 by screws.

Next, operation of a portable multimedia device with a display bracket switch according to an exemplary embodiment of the present invention will be described in conjunction with FIGS. 8 to 10.

Figure 8:
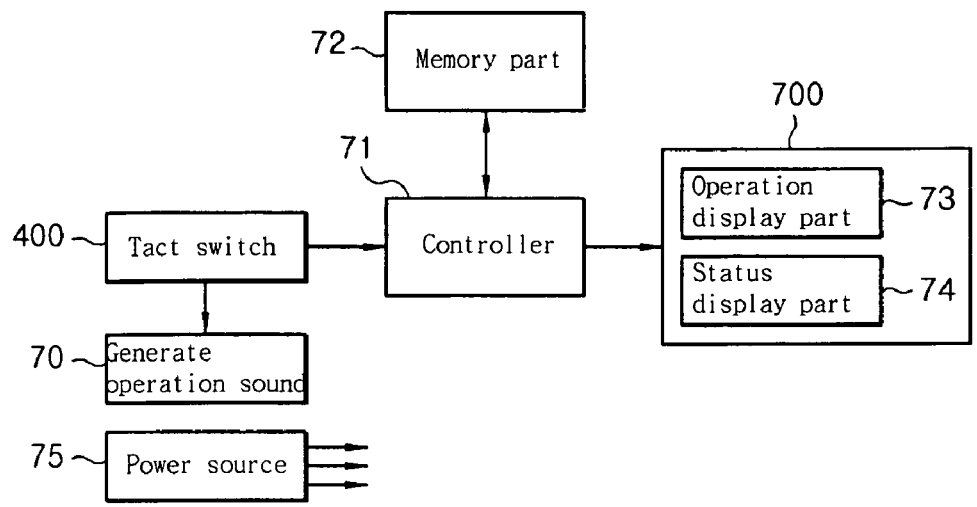
FIG. 8 is a block diagram representing operation processes of a portable multimedia device with a display bracket switch according to an exemplary embodiment of the present invention.
Figure 9:
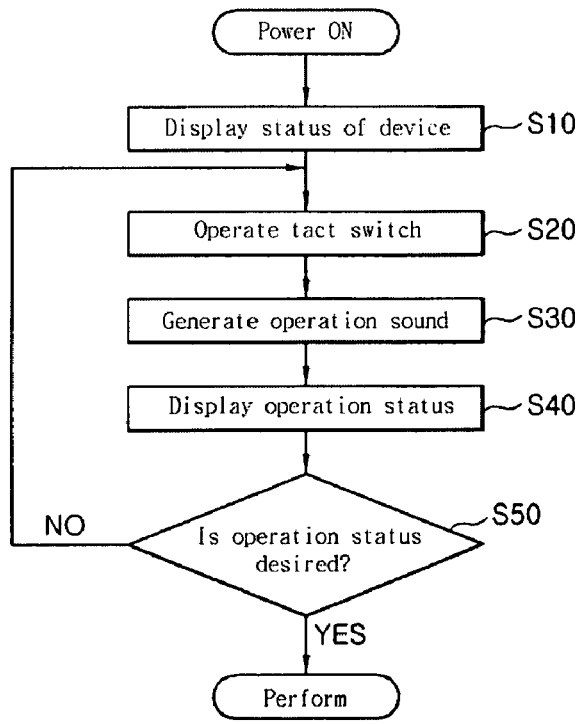
FIG. 9 is a flowchart representing operation processes of a portable multimedia device with a display bracket switch according to an exemplary embodiment of the present invention.

As shown in FIG. 8, an operation sound generator 70 generates sound corresponding to operation states of each of four tact switches 400 disposed at center portions of upper, lower, right, and left sides of the upper surface of the periphery of the PCB 300. The operation sound generator 70 is a mechanism for mechanically generating sound due to operation of the tact switches 400 depending on movement of the display bracket 100 toward the PCB bracket 200.

In addition, a controller 71 controls the portable multimedia device 1000 with a display bracket switch according to an exemplary embodiment of the present invention corresponding to operations of the switches, and a memory part 72 stores data applicable to the portable multimedia device 1000 and program files previously prepared for control of the controller 71.

As shown in FIG. 8, a plurality of operation display parts 73 are disposed corresponding to the plurality of tact switches 400, and a status display part 74 displays operation states according to each operation of the plurality of operation display parts 73 on the display window 700. FIG. 10 shows one example of the plurality of operation display parts 73 and status display parts 74 disposed on the display window 700. The plurality of operation display parts 73 are disposed at the center portion of upper, lower, right, and left sides of the upper surface of the periphery of the display window 700.

In addition, the status display parts 74 have a structure in which at least two functions are sequentially displayed according to each operation of the tact switches 400.

Also shown in FIG. 8, a power source 75 supplies power required to each component of the portable multimedia device 1000 with a display bracket switch according to an exemplary embodiment of the present invention. The power source 75 may be a conventional rechargeable battery.

Next, operation of the portable multimedia device 1000 with a display bracket switch according to an exemplary embodiment of the present invention will be described.

When a user turns a power switch of the portable multimedia device 1000 with a display bracket switch according to an exemplary embodiment of the present invention ON, an initial state of the portable multimedia device 1000 is displayed on the status display part 74 of the display window 700 (S10).

Then, when the user operates one of tact switches 400 (S20), an operation sound is generated corresponding to the operation of the tact switch 400 (S30), and an image corresponding to the operation state of the operation display part 73 is displayed on the status display part 74 (S40).

Figure 10:
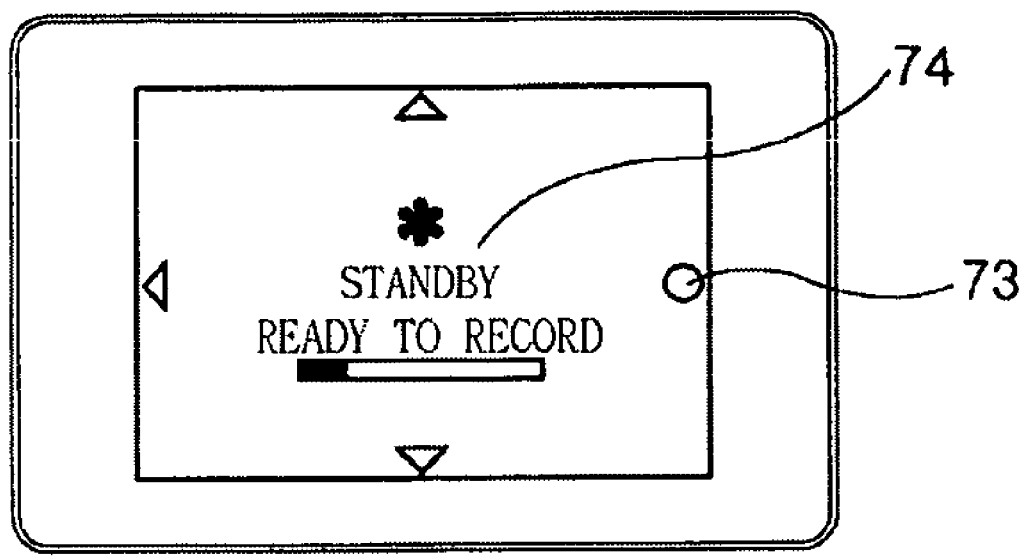
FIG. 10 illustrates examples of operation states of a portable multimedia device with a display bracket switch according to an exemplary embodiment of the present invention.
Figure 10:
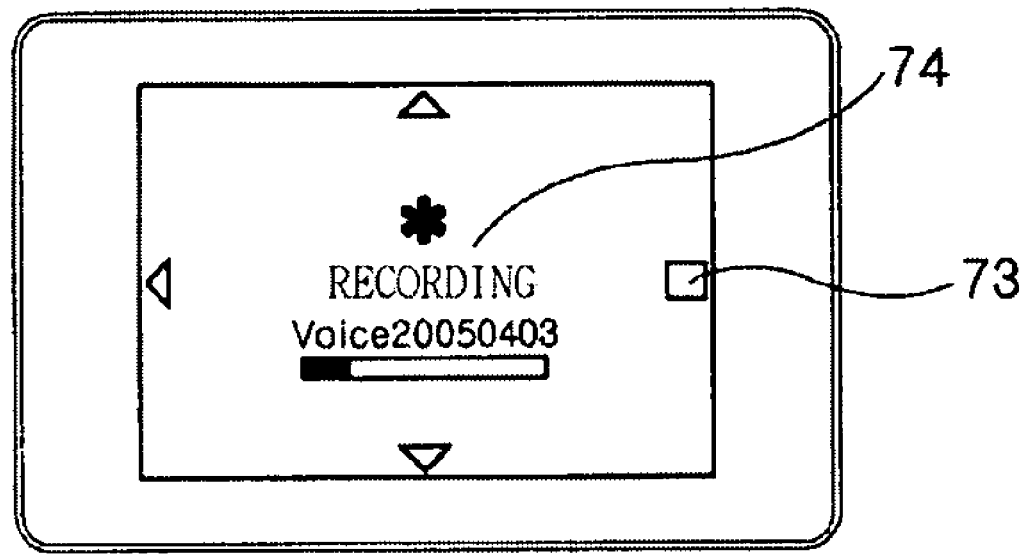

For example, as shown in FIG. 10(*a*), when a user records voice using the portable multimedia device 1000, the user pushes the right side tact switch 400, and its operation state is displayed as a circle on the operation display part 73 of the display window 700. At the same time, "STANDBY . . . READY TO RECORD" is displayed on the status display part 74.

The user then determines whether the push operation of the tact switch 400 is a desired operation or not (S50), and when it is the required operation, the portable multimedia device 1000 operates normally.

However, when the desired operation is not completed in S50, that is, when voice recording is required in the state of FIG. 10(*a*), processing returns to S10. At this point the user directly pushes the tact switch 400 on the right side of the operation display part 73 to perform a recording operation.

Next, as shown in FIG. 10(*b*), "RECORDING" representing a voice recording operation is displayed on the status display part 74, and at the same time, the right side operation display part 73 changes from a circle to a rectangular shape.

After performing the recording operation, the user pushes the tact switch 400 on the right side of the display part 73 shown in FIG. 10 to stop the recording operation.

For example, the exemplary embodiment includes the operation sound generator 70 to mechanically generate sound when the tact switches 400 are operated, in an alternative embodiment, depending on movement of the display bracket 100 toward the PCB bracket 200, a sound previously input and stored in the memory part 72 may be output through a separated output means such as a speaker or earphones.

In the portable multimedia device with a display bracket switch and the method of operating the same according to the exemplary embodiment of the present invention, since the entire display bracket can be moved toward the PCB bracket to operate the switches, separate switches need not be installed on the upper surface, and thus it is possible to enlarge the display window.

In addition, since it is not necessary for the user to look at the display window while manipulating the switches, the portable multimedia device is very convenient to operate.

Further, the user can instinctively manipulate switches on the basis of content or menus displayed on a user's interface without having to search for the right switch. Accordingly, the portable multimedia device is very convenient to operate.

While a portable multimedia device with a display bracket switch according to an exemplary embodiment of the present invention is described above, the invention is not limited to this embodiment and various modifications can be made thereto within the spirit and scope of the present invention.

What is claimed is:

1. An apparatus for digital contents playback comprising:
    a display panel for displaying the apparatus status or operator commands;
    a display panel bracket for fixedly mounting the display panel;
    a printed circuit board (PCB);
    a PCB bracket for mounting the PCB, wherein the display panel bracket is coupled with the PCB bracket allowing movement of the display panel bracket relative to the PCB bracket in the thickness direction; and
    a case for holding the PCB bracket and the display bracket, wherein the PCB comprises a plurality of tact switches disposed on an upper surface of the PCB, wherein the tact switches are actuated by the rear surface of a display cover, and wherein one of the plurality of tact switches is actuated when a locking lever is moved from a locked to an unlocked position and the corresponding upper, lower, right, or left side of the display panel is depressed.

2. The apparatus of claim 1, wherein the display panel bracket further comprises an upper case for mounting the display panel and the display cover, wherein the display cover is fixed to the upper case.

3. The apparatus of claim 2, wherein the display cover further comprises flanges for aligning with the upper case.

4. The apparatus of claim 2, wherein the display cover further comprises a plurality of guide pins projecting from a rear surface of the display cover, and wherein the plurality of guide pins are structured to restrict the lateral movement of the PCB relative to the display bracket.

5. The apparatus of claim 4, wherein the PCB bracket further comprises a holder for mounting the PCB, and wherein the holder is movably coupled to the PCB bracket.

6. The apparatus of claim 5, wherein the holder further comprises a plurality of guide holes corresponding to the plurality of guide pins, and wherein the holder is laterally movable with respect to the PCB bracket thereby allowing the plurality of guide pins to pass through the plurality of guide holes when the holder is in a first position, and preventing the plurality of guide pins from passing through the plurality of guide holes when the holder is in a second position.

7. The apparatus of claim 6, wherein the holder farther comprises a lever for moving the holder between the first and the second positions.

8. The apparatus of claim 1, wherein one of the plurality of tact switches is disposed at the center portions of each of the upper, lower, right, and left sides of the periphery of the upper surface of the PCB.

9. The apparatus of claim 1, wherein a sound generator is coupled to the plurality of tact switches for generating a sound when one of the plurality of tact switches is actuated.

10. A method of operating a digital playback device having a display bracket switch, the method comprising the steps of:
displaying status of the digital playback device on a display panel, wherein the display panel is mounted on a display bracket, and wherein the status includes a plurality of device functions;
executing one of the plurality of device functions responsive to depressing and to tilting an upper, lower, right, or left edge of the display panel, wherein moving a locking lever from a locked to an unlocked position allows the depression of one of the upper, lower, right, or left edge of the display panel;
generating a sound responsive to the execution of one of the plurality of device functions; and
displaying a revised status of the digital playback device on the display panel responsive to the executed function.

11. A display bracket switch for controlling operations of a digital playback device, the switch comprising:
a display panel fixedly mounted in a display panel bracket, wherein the display panel displays status or operator commands of the digital playback device; and
a printed circuit board (PCB) mounted in a PCB bracket, wherein the display panel bracket is coupled with the PCB bracket allowing movement of the display panel bracket relative to the PCB bracket in the thickness direction, wherein the PCB comprises a plurality of tact switches disposed on an upper surface of the PCB, wherein the tact switches are actuated by the rear surface of the display cover, and wherein one of the plurality of tact switches is actuated when a locking lever is moved from a locked to an unlocked position and the corresponding upper, lower, right, or left side of the display panel is depressed.

12. The switch of claim 11, wherein the display bracket further comprises an upper case for mounting the display panel and the display cover, wherein the display cover is fixed to the upper case.

13. The switch of claim 11, wherein the PCB bracket further comprises a locking means for preventing the movement of the display bracket relative to the PCB bracket.

14. The switch of claim 11, wherein one of the plurality of tact switches are disposed at center portions of each of the upper, lower, right, and left sides of the periphery of the upper surface of the PCB.

15. The switch of claim 11, wherein a sound generator is coupled to the plurality of tact switches for generating a sound when one of the plurality of tact switches is actuated.

* * * * *